US011052819B1

(12) United States Patent
Kondoh

(10) Patent No.: US 11,052,819 B1
(45) Date of Patent: Jul. 6, 2021

(54) INSTRUMENT DEVICE FOR VEHICLE

(71) Applicant: CALSONIC KANSEI CORPORATION, Saitama (JP)

(72) Inventor: Wataru Kondoh, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 705 days.

(21) Appl. No.: 15/777,459

(22) PCT Filed: Jan. 31, 2017

(86) PCT No.: PCT/JP2017/003285
§ 371 (c)(1),
(2) Date: May 18, 2018

(87) PCT Pub. No.: WO2017/145660
PCT Pub. Date: Aug. 31, 2017

(30) Foreign Application Priority Data

Feb. 24, 2016 (JP) .............................. JP2016-033484

(51) Int. Cl.
B60Q 3/00 (2017.01)
B60Q 3/14 (2017.01)
B60K 35/00 (2006.01)

(52) U.S. Cl.
CPC ................. *B60Q 3/14* (2017.02); *B60K 35/00* (2013.01); *B60K 2370/341* (2019.05)

(58) Field of Classification Search
CPC ............ B60K 35/00; B60Q 3/10; B60Q 3/14
See application file for complete search history.

(56) References Cited

U.S. PATENT DOCUMENTS

| 2014/0078713 | A1* | 3/2014 | Maebashi | G01D 13/04 |
| | | | | 362/23.21 |
| 2015/0092389 | A1* | 4/2015 | Harkins | B60Q 3/14 |
| | | | | 362/23.07 |
| 2016/0207453 | A1* | 7/2016 | McDade | G01D 5/262 |
| 2016/0209250 | A1* | 7/2016 | Hopersberger | B60K 35/00 |
| 2017/0158124 | A1* | 6/2017 | Zhou | G01D 11/28 |
| 2017/0227385 | A1* | 8/2017 | Ito | B60K 35/00 |
| 2018/0022215 | A1* | 1/2018 | Tomaru | G02B 6/0088 |
| | | | | 362/23.14 |

FOREIGN PATENT DOCUMENTS

| JP | 2001-59750 | 3/2001 |
| JP | 2004-77330 | 3/2004 |
| JP | 2006-112984 | 4/2006 |
| JP | 2006-292648 | 10/2006 |
| JP | 2009-264870 | 11/2009 |

OTHER PUBLICATIONS

International Search Report dated Apr. 25, 2017 in International (PCT) Application No. PCT/JP2017/003285.

* cited by examiner

*Primary Examiner* — Gerald J Sufleta, II
(74) *Attorney, Agent, or Firm* — Wenderoth, Lind & Ponack, L.L.P.

(57) ABSTRACT

The present disclosure relates to a vehicle instrument device including a dial plate, and an illumination casing disposed on the back side of the dial plate. A least the dial plate includes an indicator needle shaft hole. The illumination casing includes a tubular wall which fits the indicator needle shaft hole. The illumination casing is provided with ribs which are longer than a contact length of the tubular wall relative to the dial plate. The dial plate is provided with rib receiving holes to which the ribs are inserted.

4 Claims, 4 Drawing Sheets

US 11,052,819 B1

INSTRUMENT DEVICE FOR VEHICLE

CROSS-REFERENCE TO RELATED APPLICATION

This application is based upon and claims the benefit of priority from Japanese Patent Application No. 2016-033484 filed to the Japan Patent Office on Feb. 24, 2016, the entire disclosure of which is incorporated herein by reference.

TECHNICAL FIELD

The present disclosure relates to an instrument device for a vehicle.

BACKGROUND ART

A vehicle such as an automobile includes an instrument panel in a front portion of a vehicle cabin. The instrument panel includes an instrument device for a vehicle (a vehicle instrument device) in a position which faces a driver's seat or in a central position of the instrument panel in the vehicle width direction (Patent Literature 1: JP 2006-112984A, for example).

The vehicle instrument device includes at least a dial plate and an illumination casing which is installed on the back side of the dial plate. Further, at least the dial plate includes an indicator needle shaft hole, and the illumination casing includes a tubular wall which fits the indicator needle shaft hole.

SUMMARY

However, the above vehicle instrument device has following issues. Specifically, when the dial plate is mounted to the illumination casing, the edge of the indicator needle shaft hole in the dial plate may contact the tubular wall of the illumination casing so that the tubular wall damages the edge of the dial plate in the indicator needle shaft, which deteriorates an appearance of the dial plate with a dent or the like.

Accordingly, a main object of the present disclosure is to solve above issues.

To overcome the above problem, according to the present disclosure provides an instrument device for a vehicle. The instrument device includes a dial plate; and an illumination casing on a back side of the dial plate. At least the dial plate includes an indicator needle shaft hole, and the illumination casing includes a tubular wall that fits the indicator needle shaft hole. The illumination casing includes a rib that is longer than a contact length of the tubular wall relative to the dial plate. The dial plate includes a rib receiving hole to which the rib is inserted.

DETAILED DESCRIPTION

Hereinafter, an embodiment of the present disclosure will be described in detail with reference to the accompanying drawings. FIGS. 1 to 6 are drawings for illustrating this embodiment.

First Embodiment (Configuration) Hereinafter, the configuration of this embodiment will be described.

A vehicle such as an automobile includes an instrument panel provided in a front portion of a vehicle cabin. The instrument panel includes an instrument device for a vehicle (referred to as a vehicle instrument device, hereinafter) in a position which faces a driver's seat, or a central position of the instrument panel in the vehicle width direction.

Figure 1:
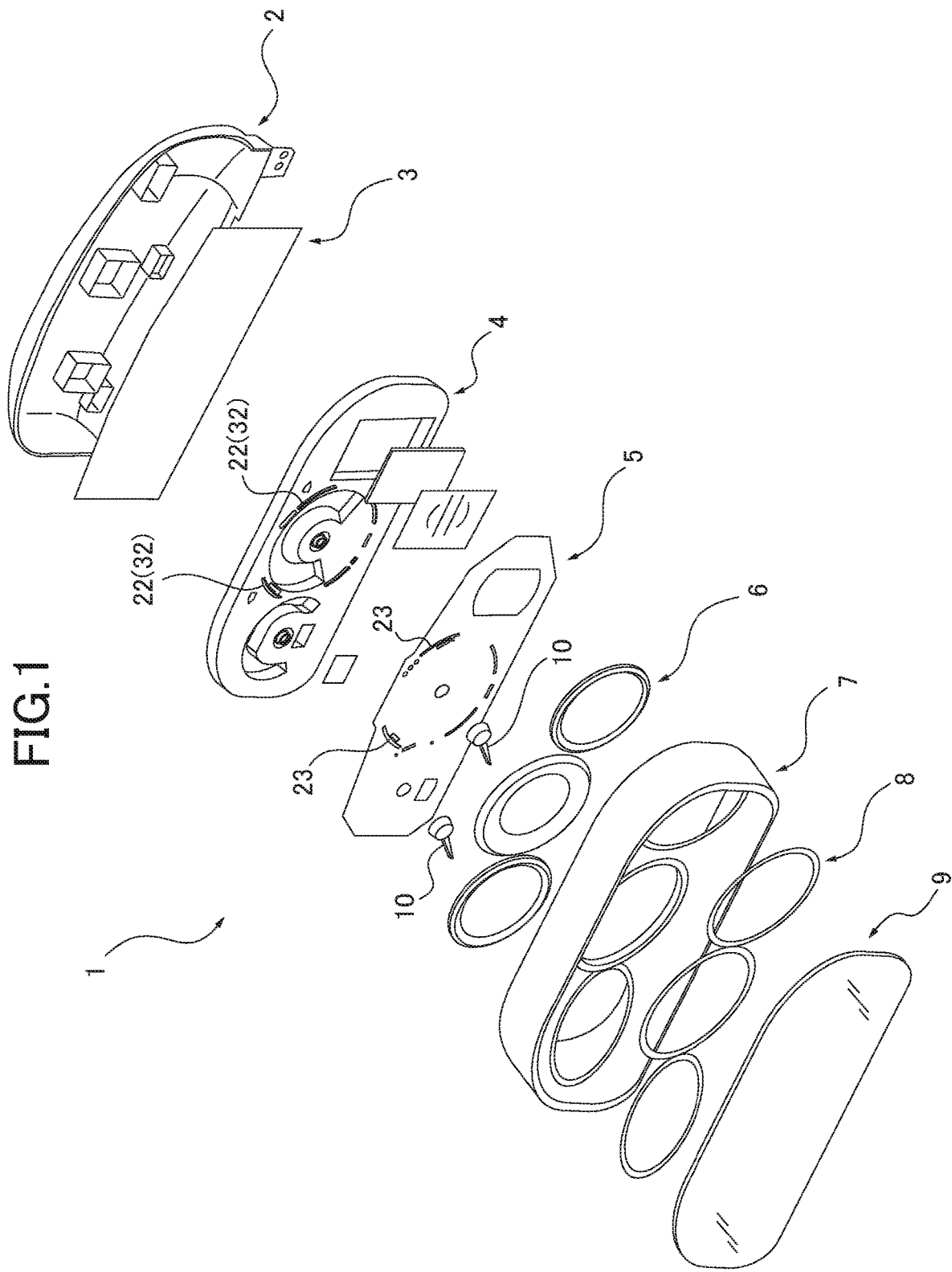
FIG. 1 is an exploded perspective view illustrating a vehicle instrument device according to an embodiment.

FIG. 1 is an exploded perspective view illustrating a vehicle instrument device 1. In the order from the back side to the front side of the vehicle instrument device 1, the vehicle instrument device 1 includes a lower casing 2, a circuit board 3, an illumination casing 4, a dial plate 5, a scale ring 6, an upper casing 7, a decorative ring 8, a transparent cover 9 and the like. In addition, an indicator needle 10 is rotatably disposed on the front side of the dial plate. Note that the configuration of the vehicle instrument device 1 may not be limited to the above.

Figure 2:
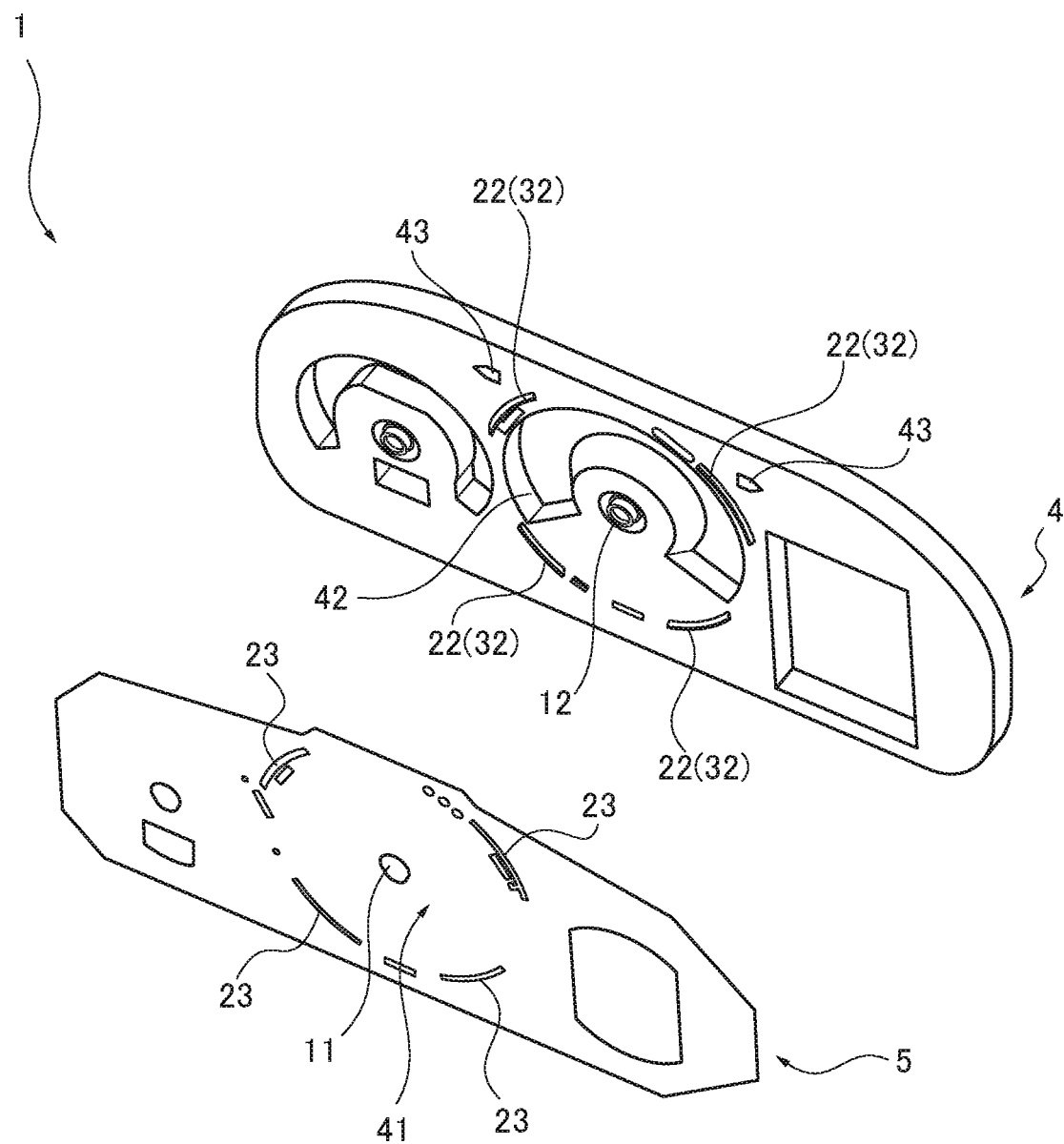
FIG. 2 is an exploded perspective view illustrating a dial plate and illumination casing shown in FIG. 1.

As shown in FIG. 2, the vehicle instrument device 1 includes at least the dial plate 5 and the illumination casing 4 attached to the back side of the dial plate 5.

Figure 3:
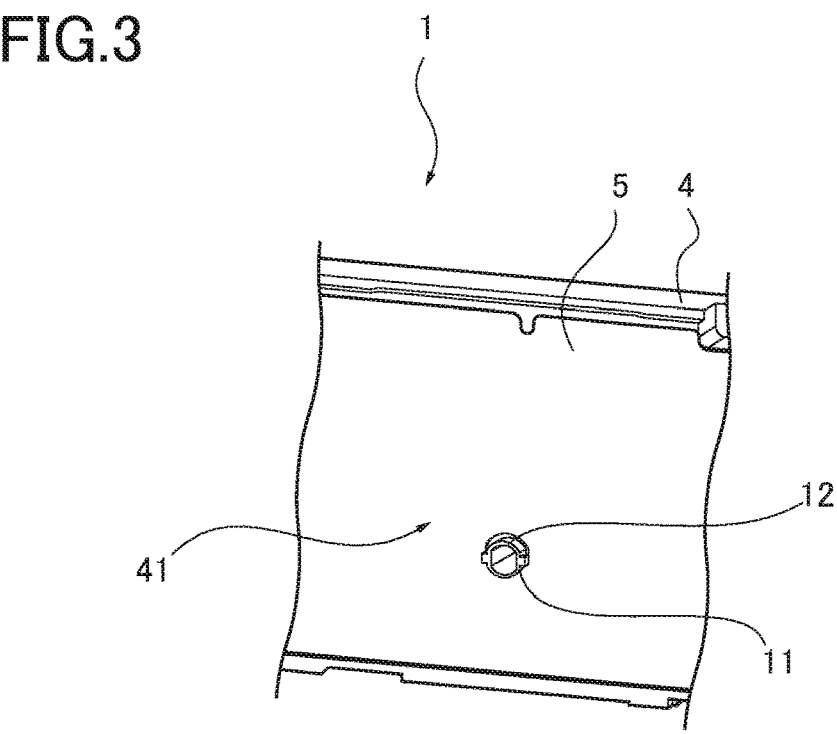
FIG. 3 is a perspective view illustrating the dial plate mounted to the illumination casing.
Figure 4:
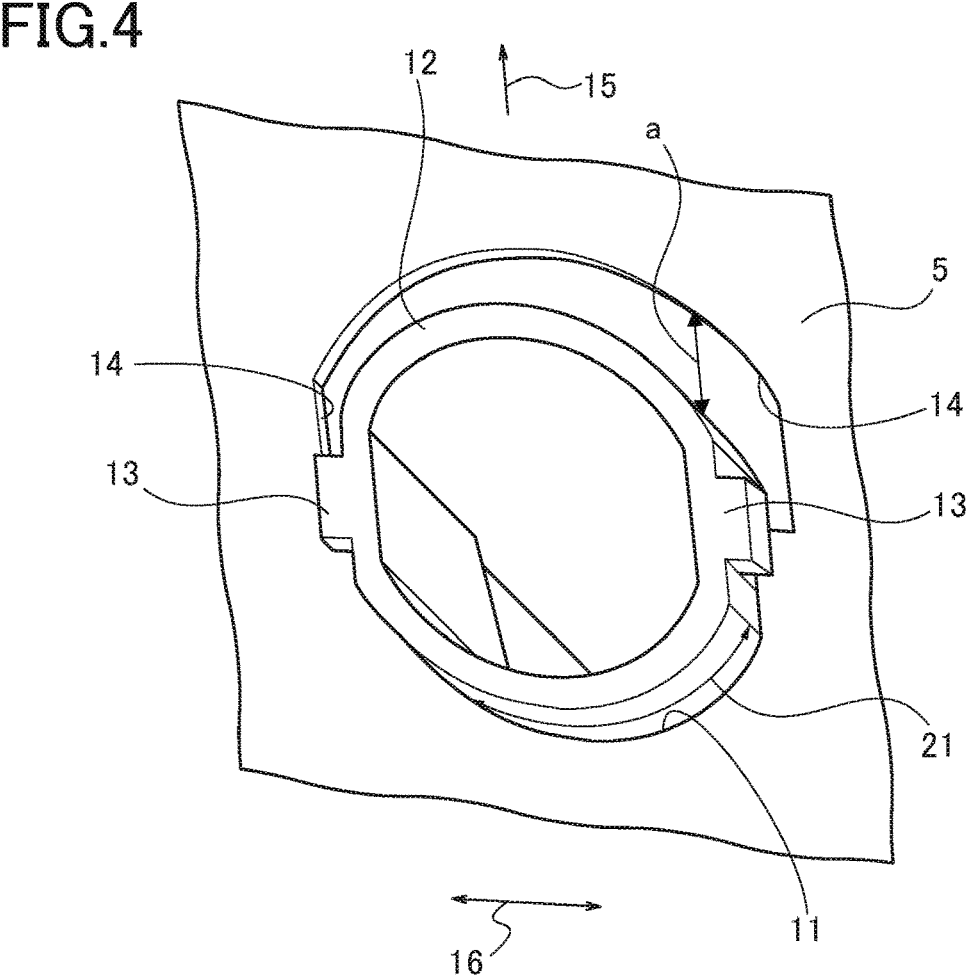
FIG. 4 is a partially enlarged perspective view illustrating an indicator needle shaft hole and a tubular wall shown in FIG. 3.

As shown in FIGS. 3, 4, at least the dial plate 5 includes an indicator needle shaft hole 11, and the illumination casing 4 includes a tubular wall 12 which fits or inserted into the indicator needle shaft hole 11.

For example, the dial plate 5 is configured such that a non-translucent print layer is formed on a transparent film to leave a display portion which is translucent or semi-translucent. The illumination casing 4 defines an illumination room where a light source is disposed to illuminate the display portion of the dial plate 5. For example, the illumination casing 4 is made of a white resin or the like which has high reflectivity. The light source is mounted on the circuit board 3 and disposed within the illumination room.

As shown in FIG. 4, the diameter of the indicator needle shaft hole 11 has substantially the same size as that of the tubular wall 12. The indicator needle shaft hole 11 is an elongate hole which extends in a mounting direction 15 of the dial plate 5 relative to the illumination casing 4 (from bottom to top in the case shown in the figure). The indicator needle shaft hole 11 extends at least by the amount necessary to mount the dial plate 5 to the illumination casing 4. The tubular wall 12 includes protrusions 13 which engage with an edge of the indicator needle shaft hole 11 to prevent the dial plate 5 from being away from the illumination casing 4. The indicator needle shaft hole 11 includes an escape portion or releasing portion 14 through which the protrusions 13 is inserted or extends when the tubular wall is set to fit the indicator needle shaft hole.

In this embodiment, a pair of protrusions 13 is provided in portions of the tip of the tubular wall 12 which extends to the front side of the dial plate 5 through the indicator needle shaft hole 11. The protrusions 13 extend in a direction 16 (a left and right direction in the case shown in the figure)

perpendicular to the mounting direction 15 of the dial plate 5 to the illumination casing 4.

The releasing portion 14 is provided around a portion of the indicator needle shaft hole 11 which would interfere with the protrusions 13 in an initial stage of the insertion into the indicator needle shaft hole. The diameter of the indicator needle shaft hole 11 has substantially the same size as that of the tip of the tubular wall 12.

In this embodiment, the direction 16 perpendicular to the mounting direction 15 substantially corresponds to the vehicle width direction since the mounting direction 15 extends from bottom to top based on a state in which the vehicle instrument device 1 is mounted to the vehicle. The releasing portion 14 is in an upper half of the indicator needle shaft hole 11 and may be an enlarged diameter hole or the like. Note that the mounting direction 15 is not limited to the above. For example, the mounting direction 15 may be a direction from top to bottom, from left to right, or from right to left.

In this embodiment, the present disclosure further includes following elements in addition to the above basic configuration.

Figure 5:
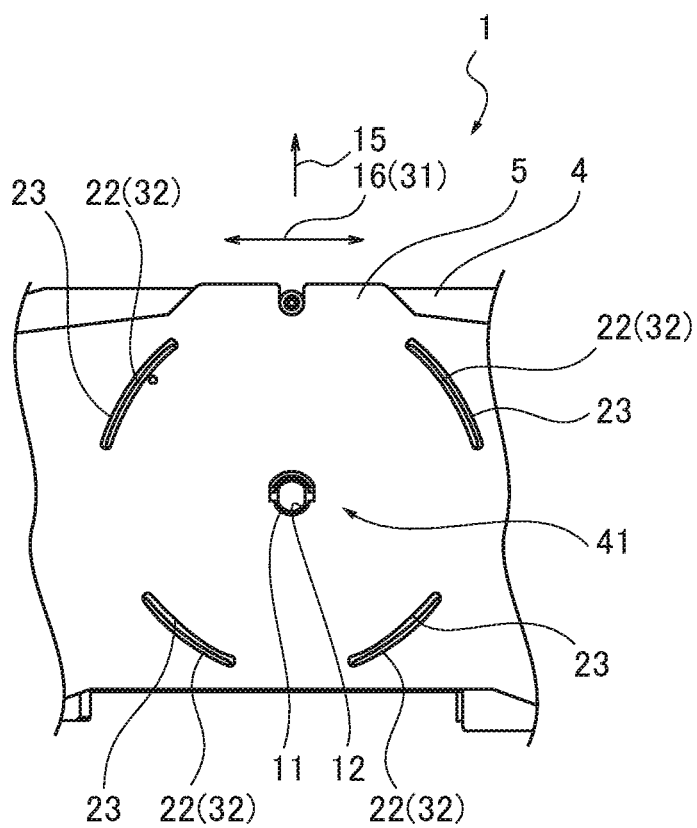
FIG. 5 is a front view illustrating the dial plate mounted to the illumination casing.
Figure 6:
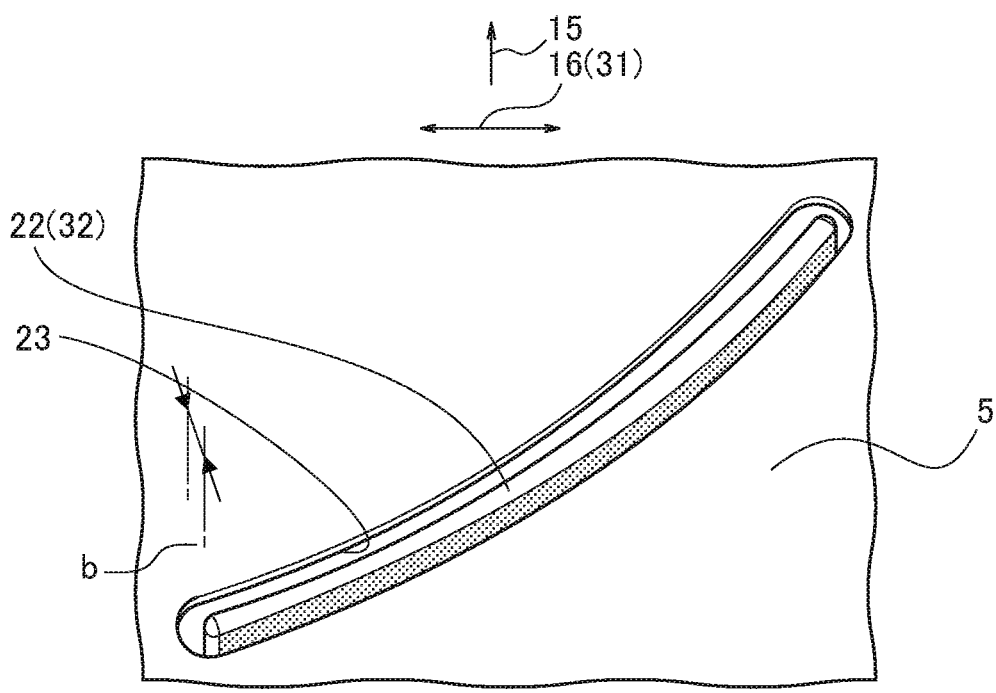
FIG. 6 is a partially enlarged perspective view illustrating a rib and a rib receiving hole shown in FIG. 5.

(1) As shown in FIGS. 5, 6, the illumination casing 4 includes ribs 22 each of which is longer (or larger) than a contact length 21 (see FIG. 4) of the tubular wall 12 relative to the dial plate 5. The dial plate 5 includes rib receiving holes 23 to which the ribs 22 are inserted, respectively (the contact length 21 of the tubular wall 12 relative to the dial plate 5<the size or the length of the ribs 22).

Here, the contact length 21 relative to the dial plate 5 is literally the length of a portion (an arc or the like) of the tubular wall 12 which abuts to (or contacts) the dial plate 5. For example, in the case where the tubular wall 12 abuts to the dial plate 5 along the entire circumference, the contact length 21 is the length of the entire circumference (arc length) of the tubular wall 12. Alternatively, in the case where the tubular wall 12 abuts to the dial plate 5 along a half of the circumference, the contact length 21 is the length of the half-circumference (half-arc length) of the tubular wall 12.

Each of the ribs 22 is longer than the contact length 21 and has a length or size easier to be recognized when the dial plate 5 is mounted to the illumination casing 4. As shown in FIG. 6, each of the rib receiving holes 23 has a width broader than that of the rib 22 at least by an amount required when the dial plate 5 is mounted to the illumination casing 4. Preferably, each rib 22 has a height substantially the same as that of the tubular wall 12.

(2) It is preferable that each rib 22 includes at least a portion 32 extending in a direction 31 crossing the mounting direction 15 of the dial plate 5 relative to the illumination casing 4.

The portion 32 extending in the direction 31 crossing the mounting direction 15 may partially extend along the rib 22 or entirely extend along the rib 22. In this embodiment, the portion 32 extending in the direction 31 crossing the mounting direction 15 extends along the substantially entire length of the rib 22. The rib 22 may be straight or curved.

Most preferably, the portion 32 extending in the direction 31 crossing the mounting direction 15 of the dial plate 5 relative to the illumination casing 4 extends in the direction 16 perpendicular to the mounting direction 15 or a direction close to perpendicular to the mounting direction 15.

Preferably, the portion 32 is provided on each side of the tubular wall 12 (the left and right of the tubular wall 12 in the case shown in FIG. 5) in relation to the direction 31 crossing the mounting direction 15. The portion 32 provided on each side of the tubular wall 12 may be a continuous portion or a plurality of separated portions. In this embodiment, the portion 32 on each side of the tubular wall 12 is separated into a plurality of portions.

(3) It is preferable that the rib 22 is provided at least on each side of the tubular wall 12 in relation to the mounting direction 15 of the dial plate 5 relative to the illumination casing 4.

In the case shown in FIG. 5, each side of the tubular wall 12 corresponds to the upper side and the bottom side of the tubular wall 12.

(4) Specifically, as shown in FIG. 2, the dial plate 5 includes an instrument display area 41 around the indicator needle shaft hole 11. The illumination casing 4 includes an instrument illumination room 42 around the tubular wall 12 to face the back side of the instrument display area 41. The ribs 22 are disposed outside of the instrument illumination room 42 of the illumination casing 4. The rib receiving holes 23 are disposed outside of the instrument display area 41 of the dial plate 5.

The instrument display area 41 is a display area of a speedometer and/or a tachometer and the like, for example. The instrument illumination room 42 is configured to illuminate the display area of the speedometer and/or the tachometer and the like. The instrument illumination room 42 is configured as a circular recess or an arcuate recess. Note that the inside of the tubular wall 12 is configured as an indicator needle illumination room. The speedometer and/or the tachometer and the like include scale marks to which the indicator needle 10 points so that numerical values can be read, and the scale marks are disposed in outermost positions of an area where the indicator needle 10 rotates. Accordingly, the position outside of the instrument illumination room 42 and the position outside of the instrument display area 41 are located outside of the scale marks.

In this embodiment, four ribs 22 are disposed around the instrument illumination room 42, and four rib receiving holes 23 are disposed around the instrument display area 41 which is substantially circular. Each of the rib 22 and the rib receiving hole 23 has an arcuate shape with the tubular wall 12 as its center. The ribs 22 and the rib receiving holes 23 are disposed in positions displaced approximately 45 degrees in the circumferential direction from the mounting direction 15 and the direction 16 perpendicular to the mounting direction 15. The positions displaced approximately 45 degrees in the circumferential direction may be coincident with positions where warning lights and/or guide lights (turn signals 43 shown in FIG. 2, for example) may be disposed outside of the instrument display area 41. Therefore, the positions displaced approximately 45 degrees are especially beneficial in terms of ensuring a light shielding effect between the instrument display area 41 and the warning lights and/or the guide lights.

The four ribs 22 and the four rib receiving holes 23 shown in the figures have same length. Also, the ribs 22 and the rib receiving holes 23 shown in the figures are disposed to be rotationally symmetric with the tubular wall 12 as their center, to be axisymmetric in relation to a line extending in the mounting direction 15 through the tubular wall 12, and to be axisymmetric in relation to a line extending in the direction 16 perpendicular to the mounting direction 15 through the tubular wall 12. However, the ribs 22 and the rib receiving holes 23 are not limited to the above relations. For example, the four ribs 22 and the four rib receiving holes 23 may have one of the above symmetric relations or may not have any of the above symmetric relations. Further, the four ribs 22 and the four rib receiving holes 23 may have different length in accordance with the conditions of the instrument display area 41 and/or the instrument illumination room 42. In addition, the number of the ribs 22 and the rib receiving holes 23 are not limited to four but may be one or more than one. In a case where one rib 22 and one rib receiving hole 23 are provided, the rib 22 and the rib receiving hole 23 may extend as a closed loop along the circumferences of the instrument display area 41 or the instrument illumination room 42, or may extend as a open loop with one opening. Further, in a case a plurality of ribs 22 and a plurality of rib receiving holes 23 are provided, the ribs 22 and the rib receiving holes 23 may be disposed at equal intervals or at unequal intervals along the circumferences of the instrument display area 41 and the instrument illumination room 42. Moreover, the ribs 22 and the rib receiving holes 23 are arcuate with the tubular wall 12 as their center. However, the ribs 22 and the rib receiving holes 23 may be arcuate without the tubular wall 12 as their center, straight, broken curve (broken or fold linear) or a combination thereof.

The ribs 22 and the rib receiving holes 23 may be covered by the scale ring 6 (see FIG. 1) or the like which has scale marks in the inner side thereof.

(Operation and Effect) According to the embodiment, following operations and effects can be obtained.

(Operation and Effect I) When the dial plate 5 is mounted to the illumination casing 4, the dial plate 5 is moved toward the illumination casing 4 in a direction perpendicular to the illumination casing 4 while the dial plate 5 is kept parallel to the illumination casing 4, and then the dial plate 5 is slightly moved from bottom to top so that the indicator needle shaft hole 11 receives the tubular wall 12, for example. At this time, the protrusions 13 of the tubular wall 12 extend through the releasing portion 14 (enlarged diameter hole) of the indicator needle shaft hole 11. The dial plate 5 is manually mounted to the illumination casing 4.

In mounting, if the edge of the indicator needle shaft hole 11 of the dial plate 5 contacts or abuts to the tubular wall 12, the tubular wall 12 may damage the edge of the indicator needle shaft hole 11 of the dial plate 5, which deteriorates an appearance of the dial plate 5 with a dent or the like.

Accordingly, the illumination casing 4 is provided with the ribs 22 each of which is longer (or larger) than the contact length 21 of the tubular wall 12 relative to the dial plate 5, and the dial plate 5 is provided with the rib receiving holes 23 to which the ribs 22 are inserted, respectively. Generally, force is more dispersed when hitting at a line than when hitting at a point. Therefore, providing the elongate ribs 22 can prevent the deterioration of the appearance of the dial plate 5 with a dent or the like by the force dispersion effect. It is preferable to set at least a clearance b between (the rib receiving holes 23 of) the dial plate 5 and the ribs 22 (see FIG. 6) smaller than a clearance a (see FIG. 4) between (the indicator needle shaft hole 11 of) the dial plate 5 and the tubular wall (the clearance a>the clearance b) so that the ribs 22 contact the dial plate 5 before the tubular wall 12 does when the dial plate 5 is mounted to the illumination casing 4.

In addition, the tubular wall 12 can be easily inserted into the indicator needle shaft hole 11 by using the larger ribs 22 as guides when the dial plate 5 is mounted to the illumination casing 4 since larger ribs can be better guides for installation than smaller ribs.

Further, insetting the ribs 22 to the rib receiving holes 23 guides the tubular wall 12 when the tubular wall 12 is inserted to the indicator needle shaft hole 11.

(Operation and Effect II) Each of the ribs 22 includes at least the portion 32 extending in the direction 31 crossing the mounting direction 15 of the dial plate 5 relative to the illumination casing 4. Thereby, areas protected by the ribs 22 can be extended in the direction 31 crossing the mounting direction 15 of the dial plate 5. Therefore, since the portion 32 contacts the dial plate 5 before the tubular wall 12 does, damages to the edge of the indicator needle shaft hole 11 of the dial plate 5 which would be caused by the tubular wall 12 can be prevented even if the dial plate 5 is displaced in the direction 31 crossing the mounting direction 15 when the dial plate 5 is mounted to the illumination casing 4, for example. Further, damages to the edge of the indicator needle shaft hole 11 can also be prevented even with the movement of the dial plate 5 in directions other than the mounting direction 15.

(Operation and Effect III) The rib 22 is disposed in each side of the tubular wall 12 in relation to the mounting direction 15 of the dial plate 5 relative to the illumination casing 4. Thereby, the rib 22 in one side of the tubular wall 12 certainly contacts the dial plate 5 before the tubular wall 12 does when the dial plate 5 is mounted to the illumination casing 4 so that the edge of the indicator needle shaft hole 11 of the dial plate 5 cannot be damaged by the tubular wall 12 and accordingly the appearance of the dial plate 5 cannot be deteriorated with a dent or the like.

(Operation and Effect IV) The ribs 22 are disposed outside of the instrument illumination room 42 of the illumination casing 4, and the rib receiving holes 23 are disposed outside of the instrument display area 41 of the dial plate 5. Thereby, the ribs 22 can prevent the leakage of light from the instrument illumination room 42 and the instrument display area 41, and can also ensure a light shielding effect relative to warning lights and/or guide lights (the turn signals 43 shown in FIG. 2, for example) and the like disposed outside of the instrument display area 41.

Moreover, locating the ribs 22 and the rib receiving holes 23 outside of the instrument illumination room 42 and the instrument display area 41 makes it possible to dispose the ribs 22 and the rib receiving holes 23 in a space efficient manner at locations which are not too far away from the tubular wall 12 and do not interfere with other elements.

REFERENCE SIGNS LIST

1. Vehicle Instrument Device, 4. Illumination Casing, 5. Dial Plate, 11. Indicator Needle Shaft Hole, 12. Tubular Wall, 15. Mounting Direction, 21. Contact Length, 22. Ribs, 23. Rib Receiving Holes, 31. Crossing Direction, 32. Portion Extending to Crossing Direction, 41. Instrument Display Area, 42. Instrument Illumination Room

The invention claimed is:
1. An instrument device for a vehicle comprising:
a dial plate; and
an illumination casing on a back side of the dial plate,
wherein at least the dial plate comprises an indicator needle shaft hole,
wherein the illumination casing comprises a tubular wall that fits the indicator needle shaft hole, and
wherein the illumination casing comprises a rib that is longer than a contact length of the tubular wall relative to the dial plate, and the dial plate comprises a rib receiving hole to which the rib is inserted.
2. The instrument device according to claim 1,
wherein the rib comprises at least a portion extending in a direction crossing a mounting direction of the dial plate relative to the illumination casing.

3. The instrument device according to claim 1,
wherein the rib is disposed at least in each side of the tubular wall in relation to a mounting direction of the dial plate relative to the illumination casing.

4. The instrument device according to claim 1,
wherein the dial plate comprises an instrument display area around the indicator needle shaft hole;
wherein the illumination casing comprises an instrument illumination room around the tubular wall to face the back side of the instrument display area; and
wherein the rib is disposed outside of the instrument illumination room of the illumination casing; and the rib receiving hole is disposed outside of the instrument display area of the dial plate.

* * * * *